Figure 1:
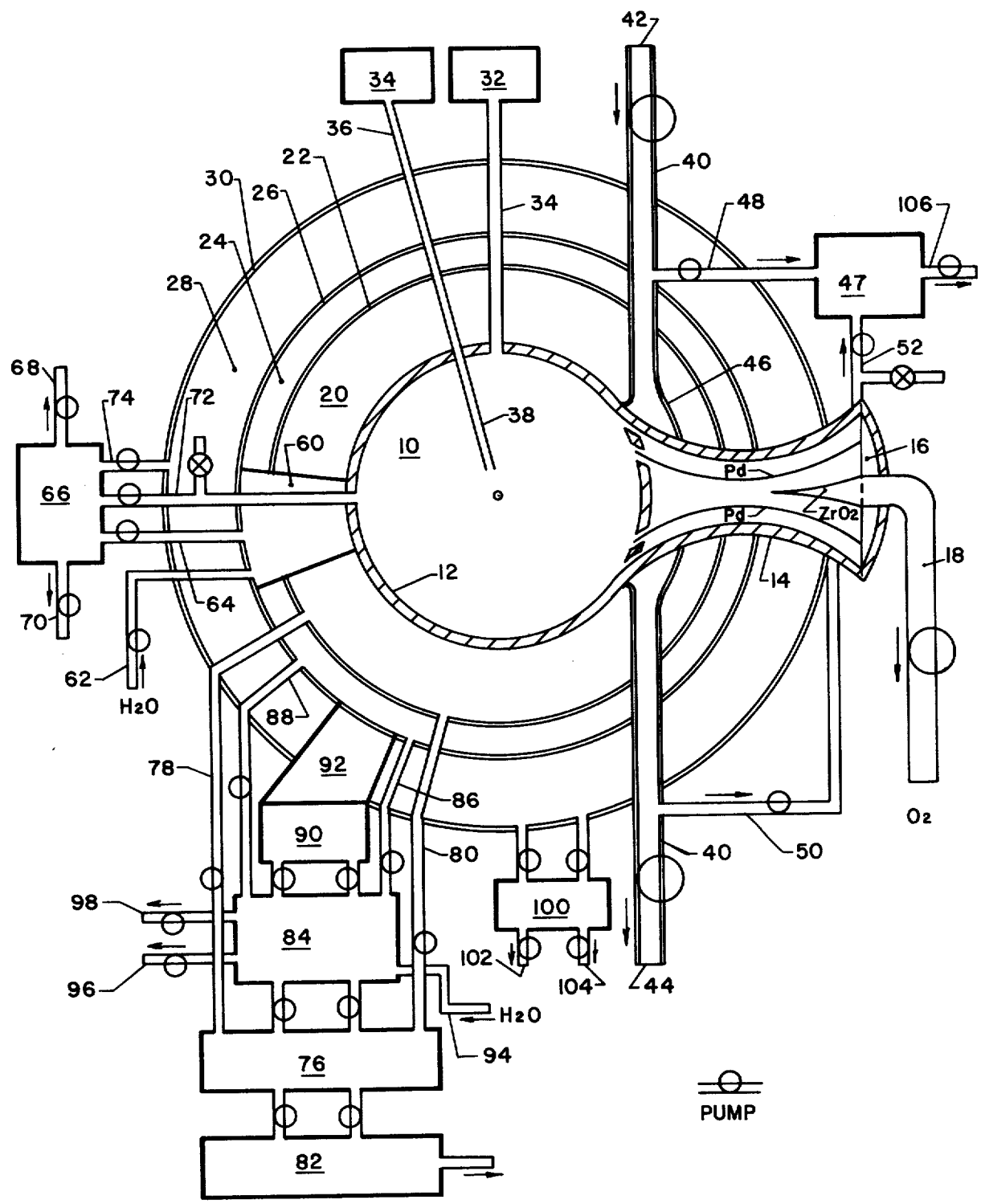

United States Patent [19]

Teichmann et al.

[11] 4,362,689
[45] Dec. 7, 1982

[54] PRODUCTION OF HYDROGEN-BASED GASEOUS FUEL

[75] Inventors: Theodor Teichmann; Henry J. Gomberg; Robert J. Teitel, all of Ann Arbor, Mich.

[73] Assignee: Texas Gas Transmission Corporation, Owensboro, Ky.

[21] Appl. No.: 718,026

[22] Filed: Aug. 26, 1976

Related U.S. Application Data

[63] Continuation of Ser. No. 414,367, Nov. 9, 1973.

[51] Int. Cl.³ ............................. G21B 1/00; G21G 1/06
[52] U.S. Cl. ............................. 376/148; 204/157.1 H
[58] Field of Search ..................... 176/1, 3, 9, 39; 403/644, 655, 656; 204/157.1 H; 376/148

[56] References Cited

U.S. PATENT DOCUMENTS

| 3,031,287 | 4/1962 | Benson et al. | 423/657 |
|---|---|---|---|
| 3,228,850 | 1/1966 | Fellows | 176/39 |
| 3,624,239 | 10/1971 | Fraas | 176/9 |
| 3,690,550 | 9/1972 | Hilberath et al. | 176/39 |
| 3,748,226 | 7/1973 | Ribe et al. | 176/9 |
| 3,802,993 | 4/1974 | von Fredersdorff et al. | 176/39 |
| 4,064,024 | 12/1977 | Lee | 376/148 |
| 4,097,348 | 1/1978 | Gomberg | 376/148 |
| 4,121,984 | 10/1978 | Gomberg et al. | 376/148 |
| 4,132,727 | 1/1979 | Gomberg | 376/148 |
| 4,140,600 | 2/1979 | Gomberg | 376/148 |
| 4,140,601 | 2/1979 | Gomberg | 376/148 |
| 4,140,602 | 2/1979 | Lewis et al. | 376/148 |
| 4,140,603 | 2/1979 | Gomberg | 376/148 |
| 4,144,150 | 3/1979 | Gomberg et al. | 376/148 |
| 4,145,269 | 3/1979 | Teitel | 376/148 |
| 4,304,628 | 12/1981 | Kummler et al. | 376/148 |

FOREIGN PATENT DOCUMENTS

| 2449230 | 10/1974 | Fed. Rep. of Germany | 176/9 |
|---|---|---|---|
| 908469 | 10/1962 | United Kingdom | 176/39 |

OTHER PUBLICATIONS

Technology Review (12/76), pp. 20-43 176-179.

*Primary Examiner*—Sal Cangialosi
*Attorney, Agent, or Firm*—Laurence R. Brown

[57] ABSTRACT

A process for producing hydrogen-based gaseous fuel which comprises causing a fusion reaction of fusion fuel and utilizing the energy from said reaction to achieve direct dissociation of water to hydrogen and oxygen, to heat carbon containing compounds to produce carbon, and to heat carbonaceous materials to produce a carbon containing gas and thereafter combining the hydrogen and the carbon or carbon containing gas to produce a hydrogen-based gaseous fuel such as methane. The process includes utilizing thermo-chemical decomposition of water and also decomposition of water by radiolysis. The water in the system is subjected to heat in a thermo-chemical reaction and also to heat derived from heat transfer mediums to volumetric heating by radiation and to radiilytic conversion energy. An apparatus is provided to accomplish these multiple functions in conjunction with the fusion reaction.

10 Claims, 2 Drawing Figures

PRODUCTION OF HYDROGEN-BASED GASEOUS FUEL

This is a continuation of application Ser. No. 414,367, filed Nov. 9, 1973.

This invention relates to the Production of Hydrogen-Based Gaseous Fuel and more particularly to a method and apparatus for such production.

There is presently an active program devoted to the achievement of fusion by illuminating a pellet of fusion fuel, such as deuterium or deuterium-tritium, with a laser beam. The resulting controlled fusion will provide a source of high energy in the form of charged particles, electromagnetic and thermal radiation and neutrons. While there are a number of different approaches to this problem, one of them includes the utilization of a source of energy from a laser and particular pellet configurations which will make it possible to achieve ignition and burn in a reaction chamber. U.S. patents which illustrate generally the apparatus which can be used in this type of system are:

Whittlesey: No. 3,378,446; Apr. 16, 1968
Daiber: No. 3,489,645; Jan. 13, 1970
Hedstrom: No. 3,762,992; Oct. 2, 1973

Available publications directed to this general subject are:

1. K. A. Brueckner, "Laser Driven Fusion" IEEE Trans. on Plasma Science, PS-1 p. 13 (1973).
2. R. Carruthers, et al, "The Economic Generation of Power from Thermonuclear Fusion" CLM-R85, UKAEA, Culham Laboratory, October, 1967.
3. R. Hancox & I. J. Spalding, "Reactor Implications of Laser Ignited Fusion" CLM-P310, UKAEA, Culham Laboratory, December 1972.

Neutron generators supporting fusion reactions have long been available and are evidenced by such publications as "Radiobiological Applications of Neutron Irradiation", proceedings of a Panel, Vienna, December 1971, published by the International Atomic Energy Agency, Vienna, 1972.

Prior to the filing date of this continuation application many articles have been published showing the state of the art in achieving significant levels of neutron radiation by deuterium-tritium (D-T)fusion reactions ignited by laser energy, and as a matter of fact laser systems with target chambers are commercially offered by General Electric and KMS Industries, Inc., generally of the type described in detail in an article entitled "Experimental Study of Laser-Driven Compression of Spherical Gloss Shells", published in *Plasma Physics and Controlled Nuclear Fusion Research* 1974 Vol. II.

Physical parameters of fusion reactors and their various wall structures are well known as evidenced in the article "The Relevance of Various Neutron Sources to Fusion-Reactor Radiation Effects" published in *Nuclear Technology*, Vol. 22, April 1974.

Reports on successful neutron yields at high flux densities from Laser driven thermonuclear fusion reactions are published for example in the articles "Thermo-Nuclear Fusion Research with High-Power Lasers" *Research/Development* May 1975, Vol. 26 No. 5 pages 55ff. and "More Evidence that Fusion Works" published in *Laser Focus* September 1975, pages 39ff. Also copending application Ser. No. 703,197 entitled "Method and Apparatus for Nuclear Thermochemical Water Cracking" (commonly assigned) relates to the derivation of hydrogen from introduction of water into the central chamber of a fusion reactor, and is incorporated herein by reference.

Theoretical calculations of a first generation laser-driven nuclear fusion reaction utilizing deuterium-tritium pellets show that about 20 percent of the energy is available in the form of charged particles (particularly alpha-particles, but also neutral particles and electromagnetic radiation) which must be absorbed inside the reaction chamber, or on collision with the chamber wall. The balance, equal to about 80 percent, is in the form of high energy neutrons.

If the 20 percent of the energy referred to above can be absorbed and utilized within the chamber, there are a number of advantages which will accrue as follows:

1. The energy will be available directly without the losses occasioned by passage through the chamber wall and possible exterior heat transfer loops;
2. Thermal and mechanical stresses in the chamber wall will be alleviated; and
2. The radiation damage to the chamber wall will be reduced.

It is therefore one of the objectives of the present invention to disclose a method and apparatus whereby the fraction of the fusion energy, normally deposited in the walls of the chamber, may be usefully directed instead to the production of hydrogen.

Another objective is to utilize the energy, in the form of fast neutrons, which penetrates through the first chamber wall to drive thermochemical and radiochemical reactions which result in production of hydrogen.

It is a further object of the present invention to utilize the heat and energy of fusion reaction, sometimes referred to as a fusion burn, to produce a hydrogen-based, gaseous fuel.

It is a further object to provide a method and apparatus which will utilize the energy resulting from a fusion reaction to dissociate water in any form, into hydrogen and oxygen, mainly to obtain hydrogen which can be used directly as fuel.

Another object is the use of the fusion energy to produce hydrogen and in a further step to produce methane gas which can be introduced into existing gas transmission and distribution systems which are presently existing.

A still further object is the utilization of a portion of the energy of the fusion reaction to heat carbon sources, such as coal or limestone, to produce carbon monoxide or carbon dioxide gas, or carbon which can be combined at the production temperatures, about 880° F., to produce methane.

A further related object of the invention is a parallel and simultaneous utilization of the fusion energy in the form of heat and radiation in chemical cycles which can result in the thermochemical decomposition of water leaving other participating constituents unaltered.

Beyond this the same apparatus can be utilized to recover residual heat attendant to the reaction to produce addition of steam useful for conventional applications.

Other objects and features of the invention will be apparent in the following description and claims in which the principles of operation of the invention are disclosed together with the best mode presently contemplated for the achievement of the objects.

Figure 2:
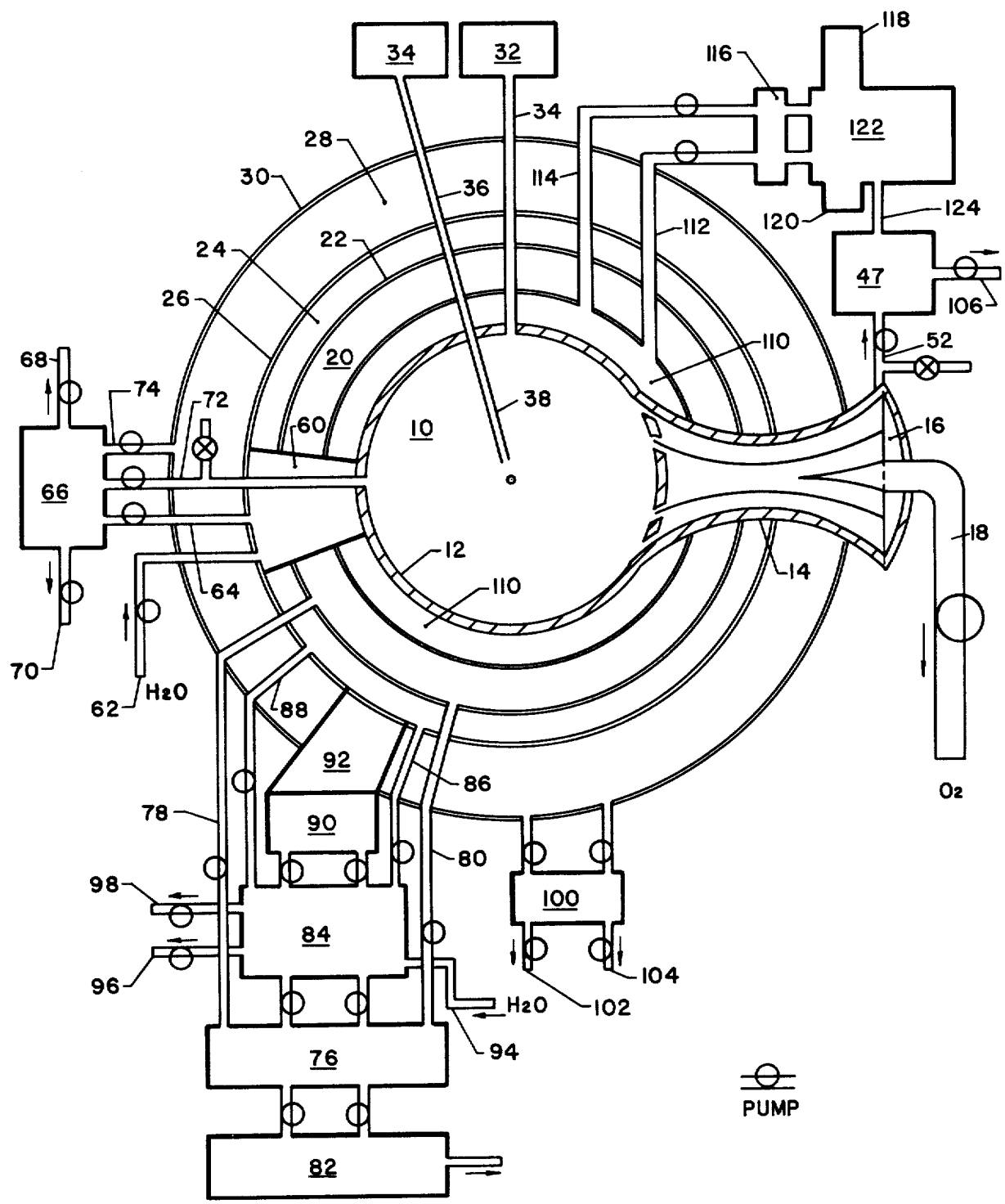

Drawings accompany the disclosure and the various views thereof may be briefly described as:

FIG. 1, illustrating in diagrammatic form an apparatus for accomplishing the objectives of the invention and FIG. 2, a modified diagrammatic presentation of an apparatus for utilizing a molten material for transferring heat to an external limestone calcination device (or other carbonaceous material heating plant).

With reference to the drawings, a reaction chamber 10 is formed by walls 12, spherical in shape, having a nozzle exit 14 terminating at 16. Centrally of the terminal end 16 is an oxygen outlet tube 18; the remainder of the nozzle discharges hydrogen which will be accumulated in any standard method in a storage tank or fed directly to the methanation plant 47 (see below). Surrounding the walls of the chamber 12 is a standard lithium heat transfer and breeding blanket 20 formed by the spherical wall 22 and outside the wall 22 is a chemonuclear heating loop 24, formed by a wall 26. Outside the wall 26 is an outer vapor radiolysis and slow-neutron shielding blanket 28 (using, e.g., a borated suspension in steam) formed by an outer wall 30.

Leading into the reaction chamber 10 is a pellet injector device 32 having a tube outlet 34 at the top of the chamber. Suitable triggering mechanisms can be utilized for injecting a pellet into the chamber under proper timing. A laser source of radiant energy 34 is directed along a tube 36 leading also to the center of the chamber 10. The end 38 of the tube 36 extending to the center of the chamber is provided to prevent any disturbance of the laser beam by gaseous or other materials which may exist in the various blankets and chambers. A cross channel 40 has an entrance 42 on one side of the apparatus and an outlet 44 on the other side. This channel is enlarged somewhat at 46 as it passes over the reaction chamber wall 12 and around the nozzle portion 14 and embraces a geometric segment of the primary blanket 20. The purpose of this channel 40 is to serve as a transport for such materials as limestone or coal or other carbon containing materials (which are suitable from the activation viewpoint) and which will be subjected to volumetric neutron heating as will be later described, to produce carbon or carbon dioxide.

A methane reaction chamber 47 is connected to the channel 40 by passages 48 and 50 and is connected to the nozzle 16 through a tube 52 so that carbon or carbon dioxide may be blended with hydrogen in the chamber 47; and methane emitted through outlet 106.

Between the wall 12 and the wall 26 is a water boiler chamber 60 which is connected to a water inlet 62 and a water outlet 64. This outlet leads to chamber 66 which serves as a steam-hydrogen-oxygen separating device. This device has an oxygen outlet 68, a hydrogen outlet 70 and steam outlet 72 which leads back through the various respective chambers to the reaction chamber 10. A second steam outlet 74 leads to the vapor radiolysis blanket 28.

Also shown on the drawing is a heat exchanger 76 connected by pipes 78 and 80 to the lithium blanket chamber 20. A tritium separation plant 82 is also suitably connected to the heat exchanger 76. There is also provided a thermochemical water decomposition plant 84 which has connections to the lithium heat exchanger 76 and the chemonuclear heat loop 24, the latter being through pipes 86 and 88. The chamber 84 is also connected to a radiolytic converter 90 which is driven by neutron reaction products generated in a neutron conversion chamber 92. The chamber 84 has a water inlet 94, oxygen outlet 96 and a hydrogen outlet 98. Connected through in and out channels leading to the chamber 28 in a hydrogen-oxygen separator chamber 100, again having respective oxygen and hydrogen outlets 102 and 104.

The drawing shows indicia indicating pumps which are disposed at various points in the apparatus to produce the necessary circulation in the various pipes and chambers. The walls of the various chambers should be formed of a high-strength, temperature resistant, radiation resistant, non-corrosive material as, for example, titanium or certain alloy steels.

In the operation of the device, it will be appreciated that to avoid radioactive discharge from the outlet 44 it will be necessary to introduce to the channel 40, pure limestone or other carbonaceous materials. If such materials are not available, it will be necessary to utilize a suitable liquid heating medium to transfer heat to limestone (or other suitable carbonaceous materials) for the purpose of generating carbon dioxide (or carbon monoxide, or carbon).

Under such conditions (see FIG. 2) there will be a spherical molten fluid energy absorbing loop 110 surrounding the reaction chamber with inlet and outlet pipes 112 and 114 leading to the heat exchanger 116 which is connected to a calcination or carbonation chamber 122 by suitable pipes. A charge inlet 118 is provided for the chamber 122.

The appropriate carbon carrying products enter the methanation chamber 47 via the pipe 124, while the residue is eliminated via outlet 120.

In the operation of the device, it will be appreciated that a pellet will be injected into the chamber 10 and the laser triggered and pulsed to effect fusion of the nuclear fuel in the pellet. The result will be a fusion reaction in chamber 10 which produces charged particles, pellet debris, electromagnetic energy and neutrons. If limestone is moving through the channel 40, this will be subjected to volumetric neutron heating from the fusion reaction which will drive off carbon dioxide and pass it into the pipes 48 and 50 to the methane reaction chamber 47. Quicklime will be emitted at 44 at the other end of pipe 40. Similarly, if coal or some other suitable carbonaceous material is injected into channel 40, it will also be subjected to volumetric heating and appropriate carbon carrying materials will be generated and passed into the methane reaction chamber 47 while the residue will be emitted at 44 at the other end of pipe 40. Steam will have been introduced into the chamber 10 prior to the fusion reaction through the pipe 72 and the reaction energy will convert this steam primarily by thermal dissociation into oxygen and hydrogen. The separator nozzle 14 will discharge oxygen through pipe 18 and hydrogen may be directed through the pipe 52 into the chamber 47.

The use of a nozzle such as shown schematically at 14 in the drawing and a diffusing material results in cooling and substantially reduces the chances of recombination. Because of the fact that the velocity of the hydrogen and the oxygen will be different, it is possible to maintain the separation of the gases and to capture them in isolated quantities.

In order to remove the separated products rapidly enough to ensure a reasonable yield and reduce recombination it is necessary to have the dissociated material move out as rapidly as possible and maintain (and indeed increase) its degree of separation. This may be accomplished by the use of a nozzle designed for supersonic flow (sonic velocity at the throat) [cf "Introduction to Aeronautical Dynamics" by M. Rauscher, (Wiley, NY 1953) p. 143f]; with such a nozzle one may estimate a fractional yield $3f_w t_f 10^3/R$ grams per pulse, where $f_w$ is the fraction of the wall used for nozzle apertures, $t_f$ the flow time and R the chamber radius in meters as before. Taking $R=1$, $t_f=10^{-2}$ and $f_w=10^{-2}$, one obtains a yield of 30 percent.

As shown in FIG. 1, in order to maintain (and accentuate) the separation of hydrogen and oxygen, a portion of the nozzle 14 may be constructed of a honeycomb or grid of zirconium dioxide ($ZrO_2$) a high temperature ceramic, through which oxygen diffuses much more rapidly than hydrogen. If a section of the nozzle is as shown in FIG. 1, there will be an additional separation as the dissociated gas passes through the nozzle.

The reaction of the carbon dioxide and the hydrogen in chamber 47 will produce methane which can be taken off at the outlet 106. If limestone is not used, the carbon monoxide or the carbon itself, which is introduced into the methane chamber, will react with the hydrogen to produce methane taken off at the outlet 106. It will be appreciated that the other functions of the apparatus will be proceeding simultaneously: first of all, water through the inlet 62 will be introduced to the chamber 60 where it is heated into steam and subjected to radiation and then is passed back into the chamber 66 as steam combined with some hydrogen and oxygen. The separation process will occur here permitting oxygen and hydrogen to be taken from the chamber 66 and permitting steam to be introduced through the pipe 72 to the chamber 10. The heat exchanger 76 will be receiving heat from the lithium which is pumped through it from the lithium blanket chamber 20 and this heat will be used in the thermo-chemical reaction chamber 84 to drive the appropriate thermo-chemical reactions which decompose the water which enters through inlet 94 into hydrogen and oxygen leaving through exits 98 and 96 respectively. This process includes energy contributions and corresponding chemical reactions from direct chemo-nuclear heating of certain of the components in the chemo-nuclear loop 24 via the inlet and outlet pipe 86 and 88. In addition, certain of these thermo-chemical reaction processes will be facilitated by radiolytic reactions taking place in a radiolytic conversion chamber 90 and driven by neutron reaction products such as gamma rays, protons or alpha particles which are generated in the neutron radiation converter 92 by the neutrons issuing out of the inner heating loops. This process could be termed a thermo-radiochemical reaction. While chambers 60 and 92 are shown singly in the drawings, they can be multiplied around the periphery to optimize the production.

The chamber 100 which is receiving flow from the outer vapor radiolysis and slow neutron shielding blanket 28 will separate out the hydrogen and oxygen produced in the radiolysis of water vapor which has been introduced into the blanket from inlet 74 through chamber 66. The chamber 100 can also be duplicated around the system.

The separation and heating of carbonaceous material which has been described above and which takes place in the pipe 40 and the attendant cleaning chamber 46, depends upon the utilization of pure materials or materials which contain impurities which are either not easily activated or have very short activation half-lives. In many cases, such material may not be readily available and under those conditions, it would be necessary to remove substantial amounts of radioactive eliminants.

In order to avoid this, an alternative mode of operation may be introduced, the mechanism of which has already been described earlier and is illustrated in FIG. 2. In this embodiment, a suitable high-temperature, molten material is circulated around the reaction chamber in the loop 110 and passed into an external heat exchanger 116 via the pipe 112 and 114. This heat exchanger, in turn, is in intimate thermal contact with the calcination chamber 122, which, however, may also be used for the thermal reduction or heating of other carbonaceous materials. The limestone or other carbonaceous material is introduced into chamber 122 through the inlet 118 and the residue, lime in the case of limestone, is eliminated through pipe 120. The useful carbon component, carbon dioxide in the case of limestone, and carbon monoxide or heated carbon in the case of coal, for example, is emitted through pipe 124 and enters the methanation chamber 47 through the same pipe.

In order to avoid interference with the overall operation of the heating and irradiation system, it will be desirable to choose a suitable heat transfer medium for this loop. In particular, lead (Pb) is a prime candidate because of its desirable thermal and nuclear characteristics which include a relatively low specific heat and melting point.

I claim:

1. The process of disassociating chemical materials to produce output combustible gases with D-T fusion reaction energy, comprising in combination,
   (a) establishing a fusion reaction chamber and producing therein a D-T reaction producing heat and neutron radiation,
   (b) placing about said reaction chamber at least two additional chambers, a first and a second chamber, isolated from the central chamber and D-T fuel but placed to receive heat and neutron radiation from said D-T reaction passing out of the reaction chamber,
   (c) exposing by introduction in additional first chamber carbon containing material which will chemically react by heat and radiation energy from said D-T reaction to produce an output combustible gaseous component,
   (d) exposing by introduction in said second additional chamber water which will decompose by heat and radiation energy from said D-T reaction to produce hydrogen, and
   (e) removing said gaseous component from said reactor for use in outside systems requiring expenditure of said combustible gaseous component in a chemical process,
   (f) placing a lithium blanket surrounding substantially said reaction chamber and said first additional chamber, passing the lithium from said blanket through a heat exchanger.

2. The process defined in claim 1 wherein said additional chamber comprises a neutron shielding blanket, the material is water and the energy in said blanket produces hydrogen and oxygen by radiolysis of the water.

3. The process defined in claim 1 wherein said material is exposed in at least two successive chambers receiving heat and radiation from said D-T reaction therethrough in sequence, and wherein the gaseous component is removed separately from said successive chambers.

4. The process defined in claim 1 wherein the D-T reaction is ignited by laser energy.

5. Apparatus for producing combustible gases comprising in combination, a reaction chamber supporting therein from D-T fuel a fusion reaction producing heat and neutron radiation, at least two additional chambers, a first and a second chamber, isolated from D-T fuel but placed to receive from said fusion reaction heat and radiation energy, means for introducing in said first additional chamber a carbon containing material which will chemically react by heat and radiation from said D-T reaction to produce an output combustible gaseous component, means for introducing in said second additional chamber water which will decompose by heat and radiation from said D-T reaction to produce hydrogen, means for removing said gaseous component from said reactor for use in outside systems requiring expenditure of said combustible gaseous component in a chemical process, and a lithium blanket surrounding substantially said reaction chamber and said first additional chamber, passing said lithium from said blanket through a heat exchanger.

6. Apparatus as defined in claim 5 including means passing water as said material through said heat exchanger.

7. Apparatus as defined in claim 5 wherein said additional chamber comprises a slow neutron shielding blanket, means for introducing water to said blanket.

8. Apparatus as defined in claim 5 including an additional chamber surrounding said reaction chamber, including means for circulating a high temperature molten material through said additional chamber and heat exchange means, and means passing said raw material through the heat exchange means.

9. Apparatus as defined in claim 8 including a charge of lead for circulation through said additional chamber.

10. Apparatus as defined in claim 5 wherein said at least one additional chamber comprises a plurality of separate energy absorbing blanket chambers each having a material circulated therethrough to a heat exchanger, and wherein said raw material is circulated through the respective heat exchangers to receive said energy.

* * * * *